G. J. BERNAU.
COMBINED STRAINER AND COVER.
APPLICATION FILED SEPT. 28, 1910.
982,760.
Patented Jan. 24, 1911.
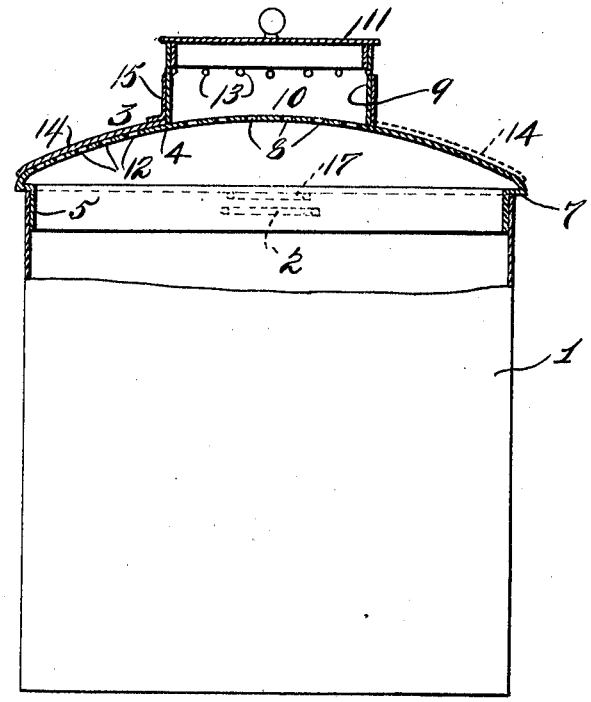
Fig. 1.
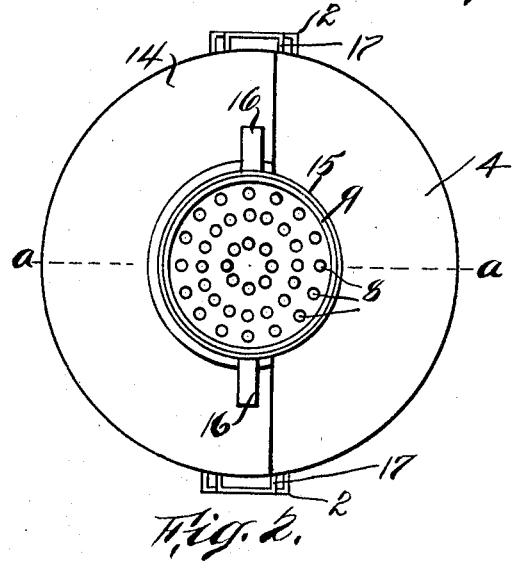
Fig. 2.
Fig. 3.
Witnesses:
C. A. Jarvis
Estelle O. Hamburger
Inventor
Gottfried J. Bernau
by Manning Bloch
attorney.

UNITED STATES PATENT OFFICE.

GOTTFRIED J. BERNAU, OF NEW YORK, N. Y.

COMBINED STRAINER AND COVER.

982,760.

Specification of Letters Patent.  Patented Jan. 24, 1911.

Application filed September 28, 1910. Serial No. 584,171.

To all whom it may concern:

Be it known that I, GOTTFRIED J. BERNAU, a citizen of the United States of America, residing at New York city, Manhattan borough, county and State of New York, have invented certain new and useful Improvements in Combined Strainers and Covers, of which the following is a full, clear, and exact description.

This invention relates to a combined pot-cover and strainer, the object being to provide a device of this character which is adapted to act as a cover for pots containing vegetables, for instance, while said vegetables are being cooked, and also to act as a strainer whereby the liquid within the pot can be drained off.

One of the special features of my invention resides in the device which I employ whereby the cover for the pot is rendered convertible into a strainer.

My improved device may be used as a strainer only.

One of the chief advantages of my improved combined pot-cover and strainer is that the liquid contents of the vessel, to which it is applied, may be drained off, without having to resort to the well known expedient of holding the cover against the vessel by one hand when the said vessel is tipped to allow the liquid to escape between the edges of the cover and vessel. It also obviates the necessity of pouring the contents of the vessel into a colander or separate strainer.

I will now proceed to describe my invention in detail, the special features of which I will finally claim, reference being had to the accompanying drawing, forming part hereof, wherein:

Figure 1 is a side view of a pot partly in section, having my improved cover applied thereto, the said cover being shown in section, the section being taken on a line $a$—$a$ in Fig. 2; Fig. 2 is a top plan view thereof on a reduced scale, and Fig. 3 is a similar view, the shutter being shown as moved to uncover the openings in the cover proper.

Referring to the drawing 1 indicates a pot of the usual variety, provided with handles 2, while 3 indicates, as a whole, my improved combined cover and strainer.

As can be seen in Fig. 1, my improved combined cover and strainer consists of a body portion 4 having a flange 5 adapted for entrance, in this instance, into the mouth or open end of the pot 1, the said body portion being slightly larger, in diameter, than the pot, whereby a shoulder 7 is provided, which rests upon the upper edge of the pot 1.

As can be seen in the drawing the body portion 4 is provided with openings 8 within a certain area, located centrally of said body portion, the said openings being surrounded by an upwardly extending wall 9, whereby a receptacle 10 by virtue of the provision of said wall is provided. For the receptacle 10 I provide a removable cap or cover 11. It will also be seen, by referring to Figs. 1 and 3, that the body portion 4 is provided with openings 12, the said openings being located exteriorly of the wall 9, and located throughout approximtely a third of the surface of the body portion 4. The openings 12 are provided for the purpose of adapting the said body portion 4 for use as a strainer, the openings 8 being provided for the purpose of forming passages for the vapor, from the liquid within the pot 1 to the receptacle 10. The function of the wall 9 is to support relatively small pots, and the like, for the purpose of keeping the contents thereof heated by the hot vapors from the pot 1. At such a time the cover 11 will be removed.

To permit of the escape of the vapor, I provide openings 13 in the wall 9 as shown. As there are a comparatively small number of openings 13, the vapor will slowly escape but yet rapidly enough to prevent the generation of any undue amount of pressure. Articles to be heated may also be placed within the receptacle 10, formed by the wall 9, and at such a time the cover 11 may be placed upon the said wall 9.

When the body portion 4 is not in use as a strainer, I provide a special means for covering the openings 12 in the body portion 4, said means consisting of a rotatably mounted shutter, 14, the said shutter being carried by a rotatable ring 15, rotatably mounted on the wall 9 and adapted for removal therefrom. The ring 15 is provided with handles 16. The body portion 4 is provided with handles 17, by which means the cover for the pot may be held in place when the said pot is tipped.

To cover the openings 12, the shutter is rotated to the position shown in Fig. 2. To use the cover as a strainer the said shutter is rotated to uncover the openings 12 as shown in Fig. 3.

Having now described my invention what I claim and desire to secure is:—

1. A pot cover consisting of a body portion, an upstanding wall carried by said body portion, said body portion being provided with radially disposed openings exteriorly of said wall, and also with openings located within said wall, a cover adapted to rest upon said wall, and a shutter rotatably mounted upon said body portion and adapted to be moved to close the openings located exteriorly of said wall.

2. A pot cover consisting of a body portion, an upstanding wall carried by said body portion, said cover being provided with radially disposed openings exteriorly of said wall, and also with openings located within the upstanding wall, a cover adapted to rest upon said wall, a ring rotatably mounted upon said wall, and a shutter carried by said ring and adapted to be moved to close the openings exteriorly of said wall.

Signed at New York city, N. Y. this 22 day of September, 1910.

GOTTFRIED J. BERNAU.

Witnesses:
JACK BANDLER,
DAVID HERSHFIELD.